United States Patent
Bailey

(10) Patent No.: US 9,007,364 B2
(45) Date of Patent: Apr. 14, 2015

(54) AUGMENTED REALITY DISPLAY APPARATUS AND RELATED METHODS USING DATABASE RECORD DATA

(75) Inventor: Samuel W. Bailey, Cardiff (GB)

(73) Assignee: salesforce.com, inc., San Francisco, CA (US)

( * ) Notice: Subject to any disclaimer, the term of this patent is extended or adjusted under 35 U.S.C. 154(b) by 267 days.

(21) Appl. No.: 13/593,940

(22) Filed: Aug. 24, 2012

(65) Prior Publication Data

US 2013/0093759 A1    Apr. 18, 2013

Related U.S. Application Data

(60) Provisional application No. 61/546,132, filed on Oct. 12, 2011.

(51) Int. Cl.
| | |
|---|---|
| *G06T 15/00* | (2011.01) |
| *G09G 5/00* | (2006.01) |
| *G06T 19/00* | (2011.01) |
| *G06F 17/30* | (2006.01) |

(52) U.S. Cl.
CPC ........ *G06T 15/00* (2013.01); *G09G 5/00* (2013.01); *G06T 19/006* (2013.01); *G06F 17/30047* (2013.01)

(58) Field of Classification Search
CPC .. G09G 5/00; G06F 17/30047; G06T 19/006; G06T 15/00
USPC ............... 345/419, 473, 474, 173; 705/26.1; 707/705; 726/3; 455/414.1
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 5,983,227 A | 11/1999 | Nazem et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

*Primary Examiner* — Phu K Nguyen

(74) *Attorney, Agent, or Firm* — Weaver Austin Villeneuve & Sampson LLP

(57) ABSTRACT

Disclosed are examples of methods, apparatus, systems, and computer program products for providing an augmented reality display of an image with record data. In one example, image data is received at one or more processors. A request message is sent requesting record data associated with the image data from one or more of a plurality of records stored in a database system. In some implementations, when the requested record data is received, a graphical display of the record data in combination with the image can be provided on a display device.

32 Claims, 11 Drawing Sheets

(56) References Cited

U.S. PATENT DOCUMENTS

| | | |
|---|---|---|
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,752,081 B2 * | 7/2010 | Calabria ...................... 705/26.1 |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Assal et al. |
| 7,945,653 B2 | 5/2011 | Zuckerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,402,512 B2 * | 3/2013 | Tam et al. .......................... 726/3 |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,626,731 B2 * | 1/2014 | Cohen et al. ................... 707/705 |
| 8,646,103 B2 | 2/2014 | Jakobson et al. |
| 8,754,863 B2 * | 6/2014 | Anantha et al. ............... 345/173 |
| 8,768,313 B2 * | 7/2014 | Rodriguez ................... 455/414.1 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |

(56) References Cited

U.S. PATENT DOCUMENTS

| | | |
|---|---|---|
| 2009/0100342 A1 | 4/2009 | Jakobson |
| 2009/0177744 A1 | 7/2009 | Marlow et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |

* cited by examiner

FIGURE 6

AUGMENTED REALITY DISPLAY APPARATUS AND RELATED METHODS USING DATABASE RECORD DATA

PRIORITY AND RELATED APPLICATION DATA

This application claims priority to and commonly assigned U.S. Provisional Patent Application No. 61/546,132, titled "Systems and Methods for an Augmented Reality CRM Application" by Samuel W. Bailey, filed on Oct. 12, 2011, which is hereby incorporated by reference in its entirety and for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present application relates generally to providing user interfaces for interacting with records in a database system, and more specifically, to display of data augmented with record data and interaction with the records via the augmented display.

BACKGROUND

"Cloud computing" services provide shared resources, software, and information to computers and other devices upon request. In cloud computing environments, software can be accessible over the Internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

Conventionally, cloud computing services are utilized via computing devices such as desktop computers with internet and web browser capability. Mobile devices such as smart phones and tablets have become popular client devices for accessing and interacting with cloud computing services.

BRIEF DESCRIPTION OF THE DRAWINGS

The included drawings are for illustrative purposes and serve only to provide examples of possible structures and process operations for the disclosed inventive systems, apparatus, and methods for augmented reality display using database record data. These drawings in no way limit any changes in form and detail that may be made by one skilled in the art without departing from the spirit and scope of the disclosed implementations.

FIG. 6 shows an example of a user page 600 of an electronic social network incorporating record data, in accordance with some implementations.

DETAILED DESCRIPTION

Figure 1A:
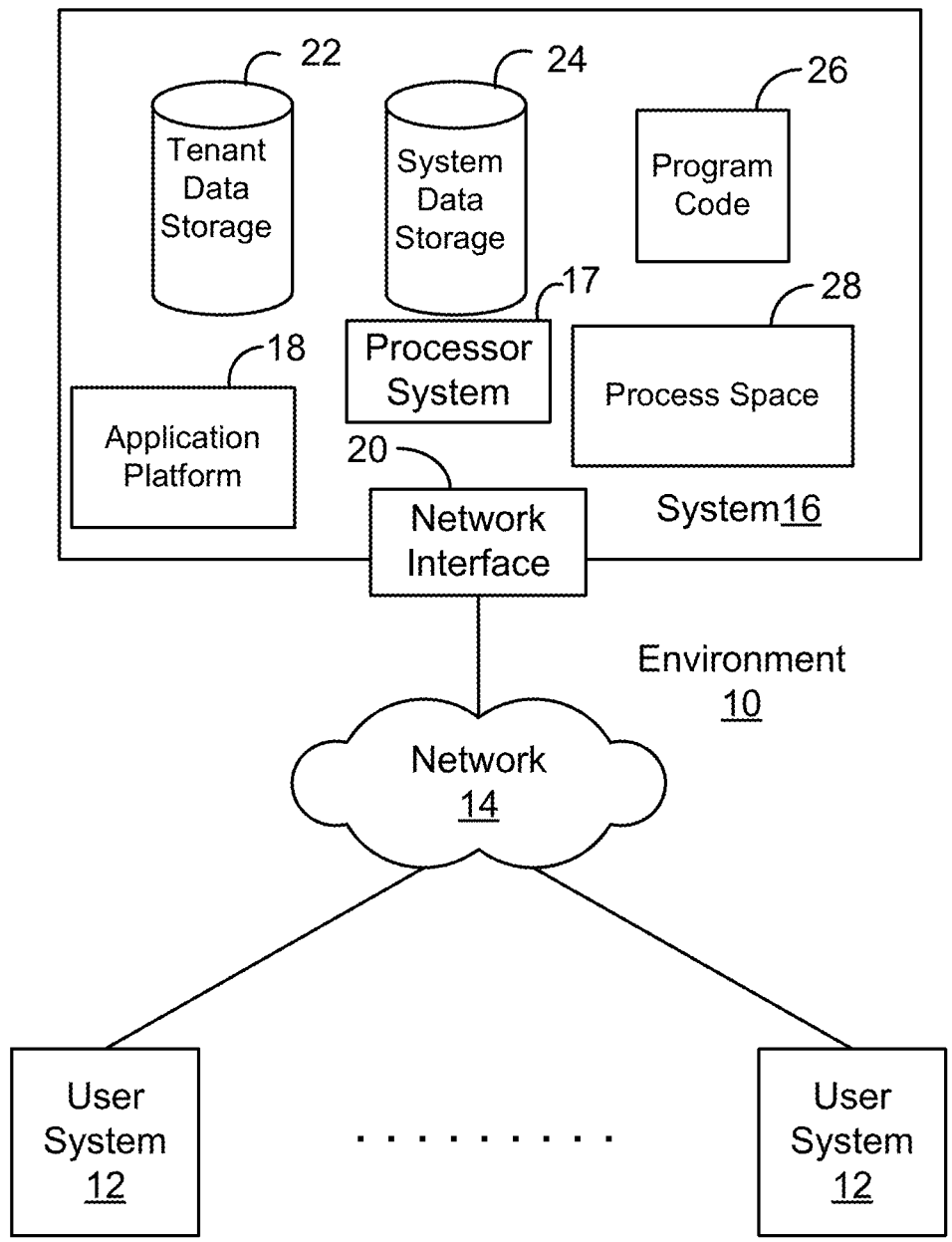
FIG. 1A shows a block diagram of an example of an environment 10 in which an on-demand database service can be used in accordance with some implementations.

Examples of systems, apparatus, and methods according to the disclosed implementations are described in this section. These examples are being provided solely to add context and aid in the understanding of the disclosed implementations. It will thus be apparent to one skilled in the art that implementations may be practiced without some or all of these specific details. In other instances, certain process/method operations, also referred to herein as "blocks," have not been described in detail in order to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the blocks of methods shown and described herein are not necessarily performed in the order indicated. It should also be understood that the methods may include more or fewer blocks than are indicated. In some implementations, blocks described herein as separate blocks may be combined. Conversely, what may be described herein as a single block may be implemented in multiple blocks.

Various implementations described or referenced herein are directed to different methods, apparatus, systems, and computer program products for providing an augmented reality display of record data in a database system. In some implementations, the disclosed methods, apparatus, systems, and computer program products may be configured or designed for use with software applications and web browser programs and, in some instances, in a multi-tenant database environment.

In some implementations, the disclosed architectures and techniques are used to provide an augmented reality display of an image with record data. For instance, a computing device such as a camera-enabled smartphone or other mobile device may capture an image in the form of a Joint Photographic Experts Group (JPEG) image file. The computing device can be web-enabled to communicate with various online services over the Internet, such as cloud-based database management applications and electronic social networks. In this way, the computing device, which captured the image, or a server in the cloud can identify a marker in the image data and match the marker with record data stored in a database. When the matching record data is retrieved, the record data can be presented in combination with a graphical display of the image on a display device such as the display of the computing device, which captured the image and, in some instances, another user's computing device such as a smartphone, tablet, laptop computer, or desktop computer. For example, the record data can be presented in a three dimensional (3D) representation model overlaid on the image when displayed on the display device.

In some implementations, the graphical display on the display device may provide a user interface to a user operating the device. Via the user interface, relevant record data in the database may be quickly accessed and updated. New records may be created. In some examples, the record data may be maintained and shared in an electronic social network, a customer relationship management (CRM) application, or both. Such social networks and CRM applications may be accessed using various web-enabled computing devices as described above. Using the disclosed techniques, any record updates made via a graphical display on the computing device may be represented in other user interfaces, such as a user interface of an electronic social network displayed on other users' computing devices. Similarly, updates via the electronic social network may be represented in the graphical display.

These and other implementations may be embodied in various types of hardware, software, firmware, and combinations thereof. For example, some techniques disclosed herein may be implemented, at least in part, by machine-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of machine-readable media include, but are not limited to, magnetic media such as hard disks, floppy disks, and magnetic tape; optical media such as CD-ROM disks; magneto-optical media; and hardware devices that are specially configured to store program instructions, such as read-only memory devices ("ROM") and random access memory ("RAM"). These and other features of the disclosed implementations will be described in more detail below with reference to the associated drawings.

The term "multi-tenant database system" can refer to those systems in which various elements of hardware and software of a database system may be shared by one or more customers. For example, a given application server may simultaneously process requests for a great number of customers, and a given database table may store rows for a potentially much greater number of customers. The term "query plan" generally refers to one or more operations used to access information in a database system.

A "user profile" or "user's profile" is generally configured to store and maintain data about a user of the database system and, in some instances, in the context of an electronic social network. The data can include general information, such as title, phone number, a photo, a biographical summary, and a status (e.g., text describing what the user is currently doing). As mentioned below, the data can include messages created by other users. Where there are multiple tenants, a user is typically associated with a particular tenant. For example, a user could be a salesperson of a company, which is a tenant of the database system that provides a database service.

The term "record" generally refers to a data entity, such as an instance of a data object created by a user of the database service, for example, about a particular user, organization, case, (actual or potential) business relationship or project. The data object can have a data structure defined by the database service (a standard object) or defined by a subscriber (custom object). For example, a record can be for a business partner or potential business partner (e.g., a client, vendor, distributor, etc.) of the user, and can include an entire company, subsidiaries, or contacts at the company. As another example, a record can be a project that the user is working on, such as an opportunity (e.g., a possible sale) with an existing partner, or a project that the user is trying to get. In one implementation of a multi-tenant database, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

FIG. 1A illustrates a block diagram of an example of an environment 10 in which an on-demand database service can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

Environment 10 is an environment in which an on-demand database service exists. User system 12 may be any machine or system that is used by a user to access a database system 16. For example, any of user systems 12 can be a handheld computing device, a tablet, a mobile phone, a laptop computer, a workstation, and/or a network of such computing devices. As illustrated in FIG. 1A (and in more detail in FIG. 1B) user systems 12 might interact via a network 14 with an on-demand database service, which is implemented in the example of FIG. 1A as database system 16.

An on-demand database service, such as system 16, is a database system that is made available to outside users, who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 1A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in storage medium(s) 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 1B:
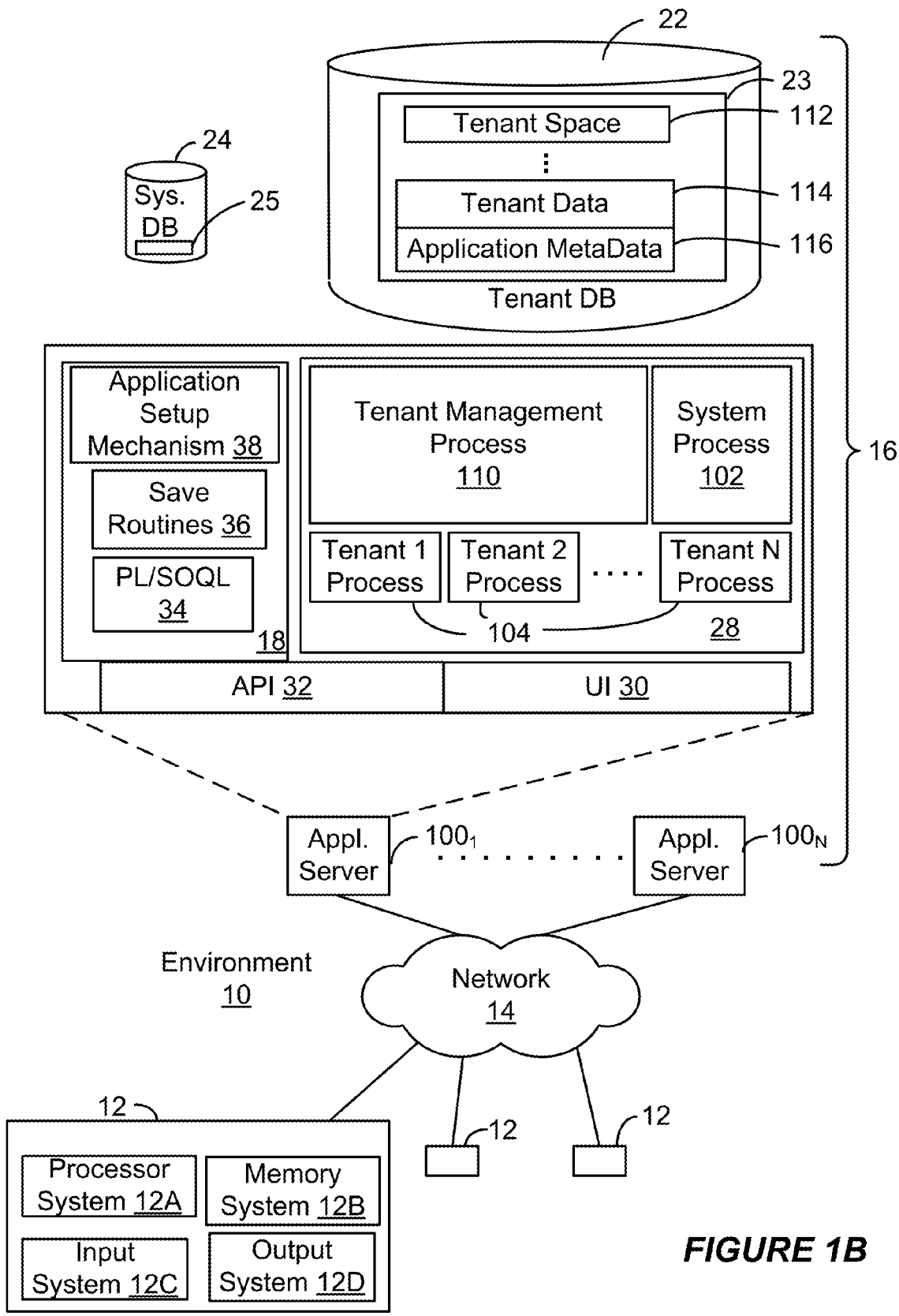
FIG. 1B shows a block diagram of an example of some implementations of elements of FIG. 1A and various possible interconnections between these elements.

One arrangement for elements of system 16 is shown in FIGS. 1A and 1B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1A include conventional, well-known elements that are explained only briefly here. For example, each user system 12 could include a desktop personal computer, tablet, workstation, laptop, PDA, cell phone, or any wireless access protocol (WAP) enabled device or any other type of computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display device (e.g., a monitor screen, LCD display, etc.) of the computing device in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. A computer program product implementation includes a non-transitory machine-readable storage medium (media) having instructions stored thereon/in, which can be used to program a computer to perform any of the processes/methods of the implementations described herein. Computer program code 26 for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computing device or system, including processing hardware and process space(s), that can be operated in conjunction with an associated storage system and database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 1B illustrates a block diagram of an example of some implementations of elements of FIG. 1A and various possible interconnections between these elements. That is, FIG. 1B also illustrates environment 10. However, in FIG. 1B elements of system 16 and various interconnections in some implementations are further illustrated. FIG. 1B shows that user system 12 may include processor system 12A, memory system 12B, input system 12C, and output system 12D. FIG. 1B shows network 14 and system 16. FIG. 1B also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers 1001-100N, system process space 102, tenant process spaces 104, tenant management process space 110, tenant storage area 112, user storage 114, and application metadata 116. In other implementations, environment 10 may not have the same elements as those listed above and/or may have other elements instead of, or in addition to, those listed above.

User system 12, network 14, system 16, tenant data storage 22, and system data storage 24 were discussed above in FIG. 1A. Regarding user system 12, processor system 12A may be any combination of one or more processors. Memory system 12B may be any combination of one or more memory devices, short term, and/or long term memory. Input system 12C may be any combination of input devices, such as one or more keyboards, touch screens, mice, trackballs, scanners and/or interfaces to networks. In addition, input system 12C may include an image capturing device, such as a web cam, a digital camera or other device capable of capturing images or videos. Output system 12D may be any combination of output devices, such as one or more display devices, monitors, display screens, printers, and/or interfaces to networks. As shown by FIG. 1B, system 16 may include a network interface 20 (of FIG. 1A) implemented as a set of HTTP application servers 100, an application platform 18, tenant data storage 22, and system data storage 24. Also shown is system process space 102, including individual tenant process spaces 104 and a tenant management process space 110. Each application server 100 may be configured to communicate with tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle| databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server 100₁ might be coupled via the network 14 (e.g., the Internet), another application server 100N-1 might be coupled via a direct network link, and another application server 100N might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain implementations, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one implementation, therefore, an interface system implementing a load balancing function (e.g., an F5 Big-IP load balancer) is communicably coupled between the application servers 100 and the user systems 12 to distribute requests to the application servers 100. In one implementation, the load balancer uses a least connections algorithm to route user requests to the application servers 100. Other examples of load balancing algorithms, such as round robin and observed response time, also can be used. For example, in certain implementations, three consecutive requests from the same user could hit three different application servers 100, and three requests from different users could hit the same application server 100. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for user, organization, case, account, contact, lead, and opportunity data objects, each containing pre-defined fields. It should be understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

One or more of the devices in the environments disclosed herein may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

As used herein, "cloud" is generally intended to refer to a data network or plurality of data networks, often including the Internet. By way of example, client machines located in the cloud may communicate with an on-demand service environment to access services provided by the on-demand service environment. For example, client machines may access the on-demand service environment to retrieve, store, edit, and/or process information.

In some implementations, application servers connected to the network(s) may include a hardware and/or software framework dedicated to the execution of various procedures (e.g., programs, routines, scripts). Some such procedures may include operations for providing the services described herein, such as performing the methods/processes described below with reference to FIGS. 2-5. In alternative implementations, two or more such servers may be included and cooperate to perform such methods, or one or more other servers can be configured to perform the disclosed methods described below.

Figure 2:
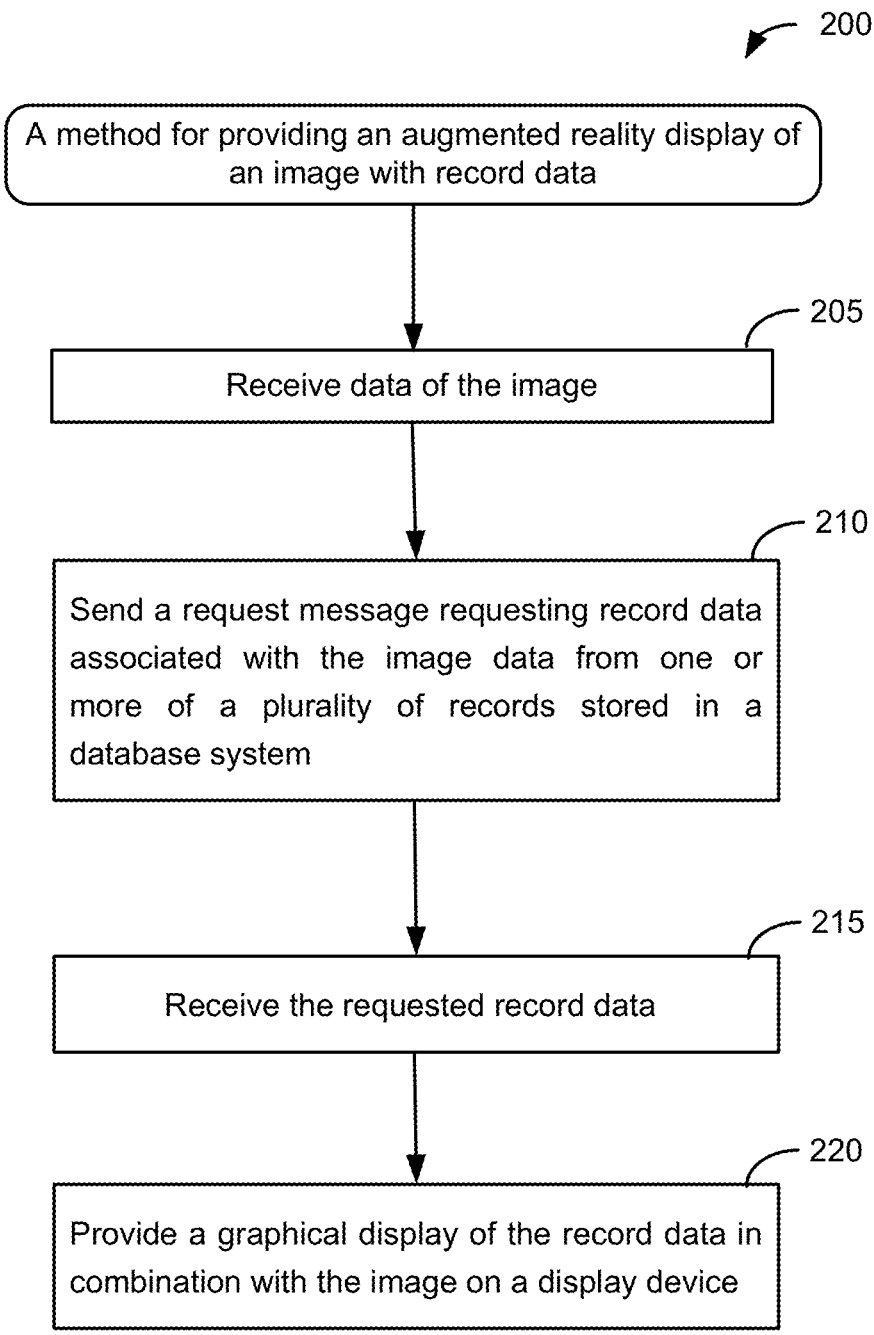
FIG. 2 shows a flowchart of an example of a method 200 for providing an augmented reality display of an image with record data, performed in accordance with some implementations.

FIG. 2 shows a flowchart of an example of a method 200 for providing an augmented reality display of an image with record data, performed in accordance with some implementations. The method 200 may be performed by any computing device or combination of computing devices with access to a database system containing record data. The computing device or devices performing method 200 and the additional methods described below may be in the form of a user system and/or any of the servers as described above with respect to FIGS. 1A and 1B. A computing device can be a fixed location device such as a personal computer (PC), desktop computer, workstation, or the like. The computing device may also be a mobile device such as a smartphone, a wireless device, a tablet, a laptop or some other handheld device.

In some implementations, a computing device may include an image capturing device and a display device. For instance, if the computing device is a fixed location device such as a desktop computer, the desktop computer may include an image capturing device in the form of a web cam and a display device such as a monitor. In another example, if the computing device is a mobile device such as a smartphone or tablet, the mobile device may include a digital camera and a display screen with touchscreen capability. The camera may be built-in and have a lens exposed through a surface of the mobile device, such as the front of the device (along a common surface with the display screen) or on the back of the device (along a surface that is opposite the surface of the display screen).

In block 205, data of an image is received at a computing device. For example, the image data may be captured by an image capturing device. The image capturing device may be a component of the computing device, such as the camera built-in to a mobile device. Alternatively, the image capturing device may be a standalone device such as a digital camera or a component of a device other than the computing device, which receives the data of an image in block 205. For instance, an image may be captured by a second device at an earlier time, stored, and then emailed and downloaded to the computing device where the image data is received in block 205.

Figure 7:
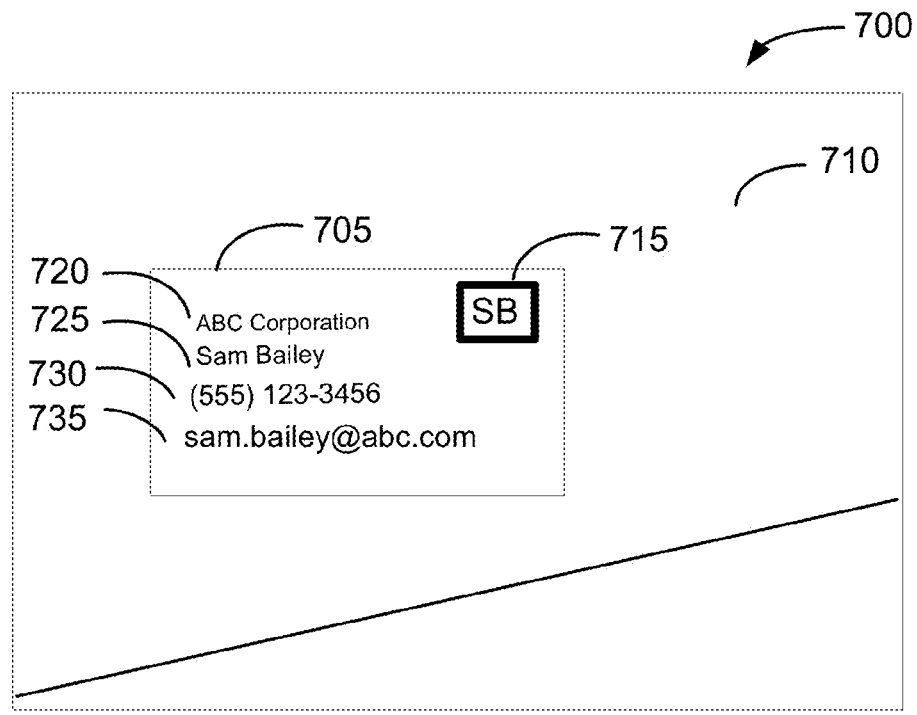
FIG. 7 shows an example of an image 700, in accordance with some implementations.

In some implementations, the image can be a capture or graphical representation of a "real world" object or scene, such as image 700 depicting a business card 705 on a desk 710, as shown in FIG. 7. However, the image may also be a drawing, an animation, a screen shot, or the like. Furthermore, "image" as used herein is not limited to a single image or image file. For example, the image may include a sequence of images in an animated image file, a video file, a video stream, or the like.

In block 210, a request message requesting record data associated with the image data is sent to the database system. For instance, a server or other computing device can request the data. The record data that is requested may be stored in one or more of a plurality of records in the database system. An example of a technique for generating the request message based on the image data is discussed in further detail below with respect to FIG. 3.

Figure 9:
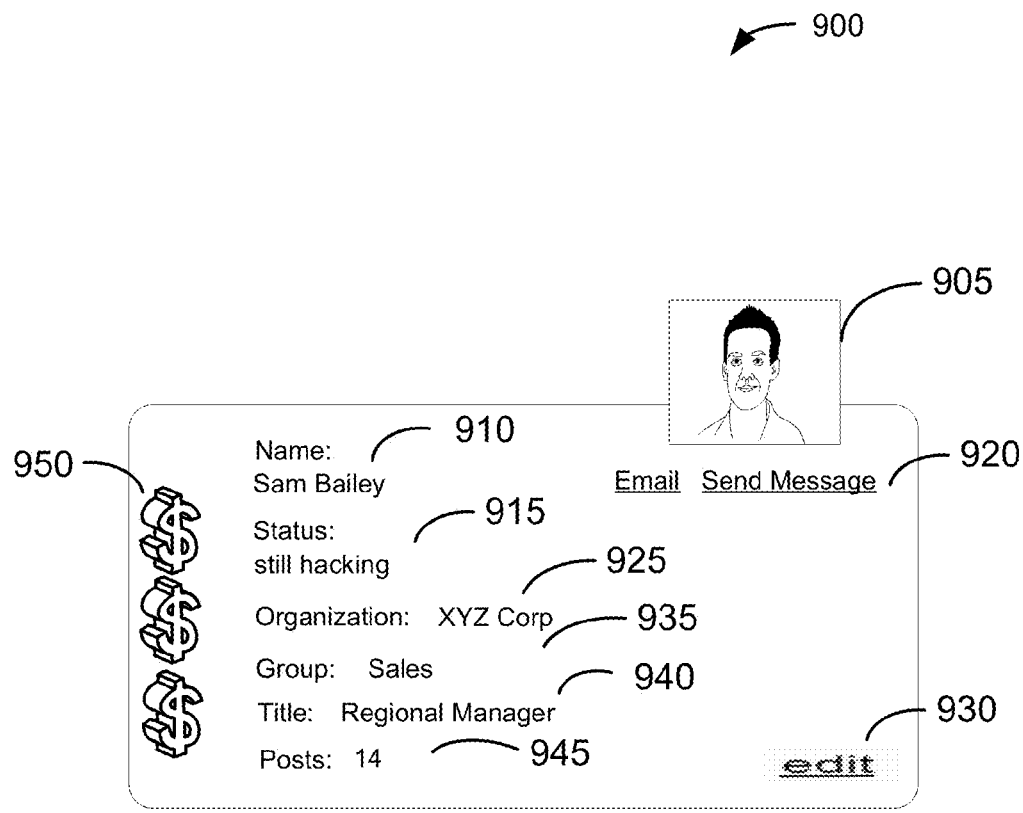
FIG. 9 shows an example of a display of record data 900, in accordance with some implementations.
Figure 10:
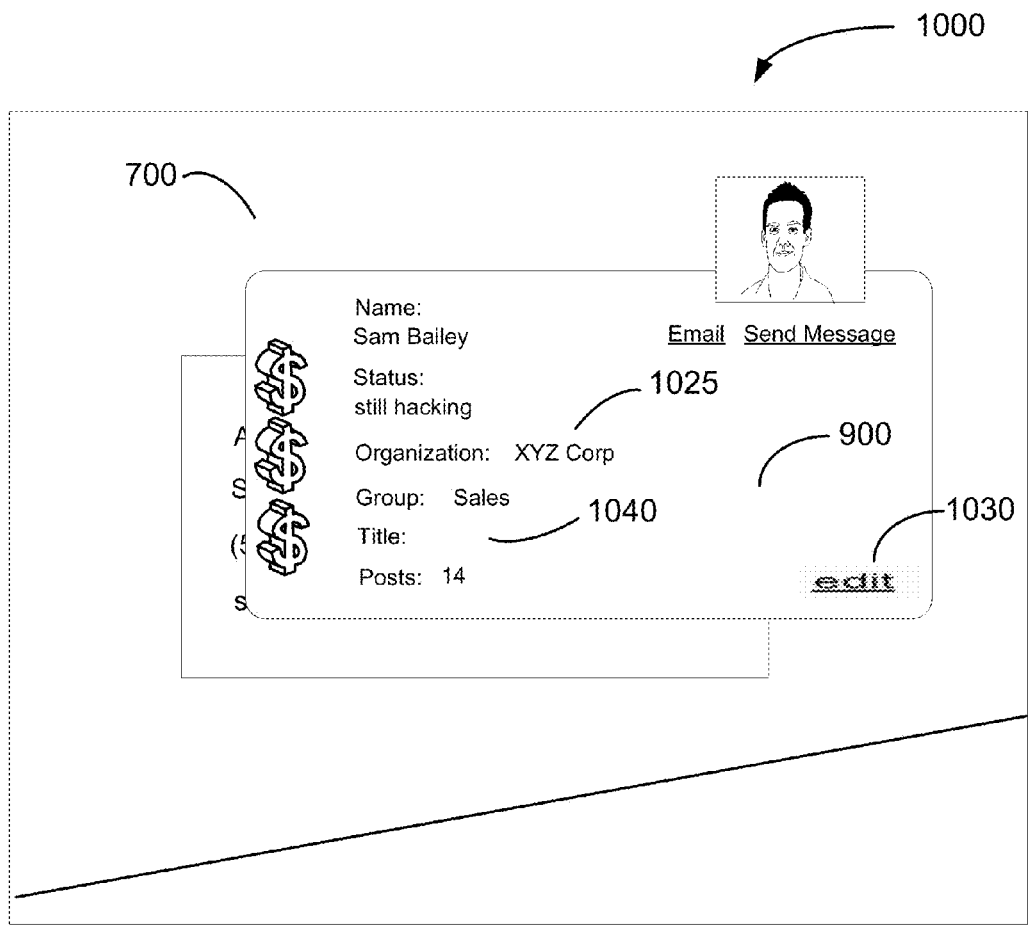
FIG. 10 shows an example of a graphical display 1000, in accordance with some implementations.

In block 215, when the requested record data is located in the database system, the requested record data can be delivered from the database system to one or more computing devices, such as the server requesting the data and/or a smartphone operated by a user. In block 220, a graphical display of the record data in combination with the image is provided to a display device. In some implementations, the record data may be overlaid on the image in the graphical display. In this case, if the image is a representation of the real world, the overlaid record data shown in the graphical display provides an augmented reality enhancement to the real world image. For example, the presentation on a display screen of a user's smartphone of the original image received in block 205 can be updated to display the overlaid record data. An example of record data 900 retrieved from a database system is shown in FIG. 9 and is described in greater detail below. In FIG. 10, an example of a graphical display 1000 is shown that includes display of the record data 900 overlaid with image 700 shown in FIG. 7, and is described in greater detail below.

Figure 3:
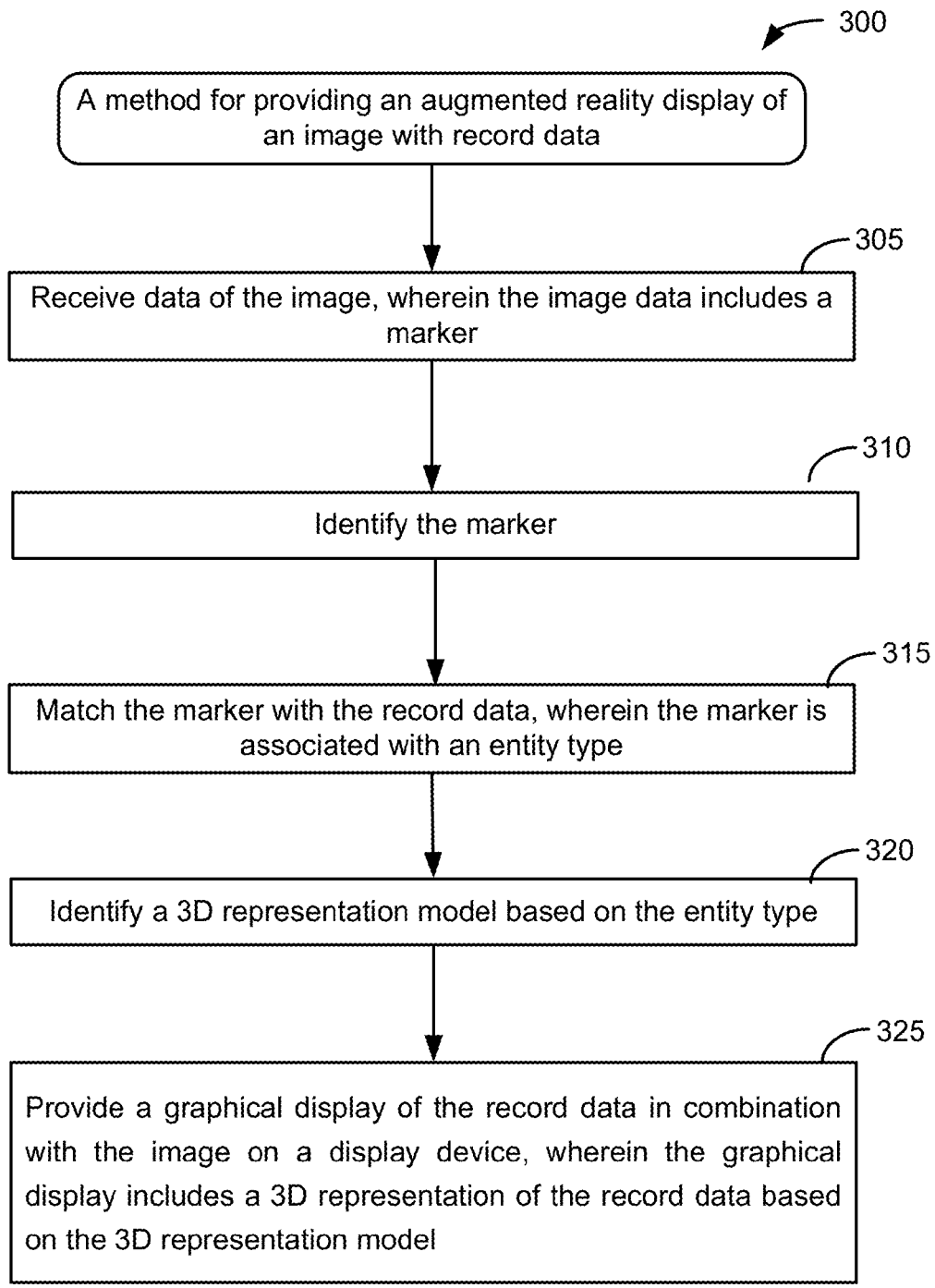
FIG. 3 shows a flowchart of an example of a method 300 for providing an augmented reality display of an image with record data, performed in accordance with some implementations.

FIG. 3 shows a flowchart of an example of a method 300 for providing an augmented reality display of an image with record data, performed in accordance with some implementations. The method 300 may be performed by any computing device or combination of computing devices, such as the devices discussed above with respect to the method 200.

In block 305, data of an image is received, as generally described above with respect to block 205 of method 200. In some instances, the image data may include data representing a graphical marker, described in greater detail below, that may be recognized by the computing device.

In block 310, the marker is identified from the image data by the one or more computing devices performing method 300. Returning to the example of FIG. 7, business card 705 includes a marker 715, organization name 720, person name 725, and contact information such as phone number 730 and email address 735. In this example, marker 715 includes the letters "SB" in a box printed on business card 700. For instance, a user may have marked or otherwise printed the SB box on card 700 for the purpose of facilitating recognition of images containing the business card. It will be appreciated that the computing device may be configured to recognize virtually any object in an image as a marker. Image and character recognition software and related techniques may be implemented at a computing device to identify objects using patterns and sequences in data contained in the pixels of an image.

In some implementations, the computing device may be configured to recognize that the image contains facial image data, such as representations of a person's eyes, ears, nose, mouth, or chin, and combinations thereof. Such facial image data can serve as the marker. Facial recognition techniques may be used so that the identity of a person may be determined from an image containing the person's facial features. Typically, this is accomplished by comparing certain facial features from the image with facial features that are stored with associated identities in a database.

In some implementations, the computing device may be configured to include optical character recognition (OCR) capability for recognizing text from an image and converting the text into machine-encoded text. Here, a marker in an image may include text in a variety of forms, such as handwritten text, electronic text (e.g., the image is a screenshot or a photograph of an electronic image display), or printed text (e.g., an image of a paper generated by a printing device). The text may be as short as a single character or a combination or string of characters. With reference to image 700 in FIG. 7, for example, one or more of organization name 720, person name 725, phone number 730 and email address 735 could be recognized as a marker.

In some implementations, one or more of the techniques described above for identifying a marker may be utilized. For example, the box of marker 715 may be differentiated from the other objects in image 700 by image recognition techniques while the "SB" text may be recognized with OCR techniques.

In block 315, the marker is matched with the record data. This may include submitting one or more queries for one or more records in the database system having data matching on the marker or data extrapolated from the marker, such as the letters "SB".

In some implementations, markers are configured such that they uniquely identify a record. Marker 715 shown in FIG. 7, for instance, may be associated with a record for a user named "Sam Bailey," where this record is uniquely identified by the user's initials, "SB". Each record may include a field that associates the record with the marker. For example, a field in the Sam Bailey record may include the letters "SB" or otherwise include data that can be matched or identified based on a sequence of numerical data contained in or determined from the pixel data of marker 715.

In some implementations, an entity type may be determined from the marker. As discussed above with reference to FIG. 1B, the database system may be organized as a set of logical tables where a table is a representation of a data object or entity. Examples of types of entities, which may be stored in a CRM database, include a user, an organization, a case, an account, a contact, a lead, and an opportunity. In some implementations, one or more tables in the database system may classify an entity has having a specified entity type. A "user" entity type, for example, may include user profiles or records containing user data in one or more tables. In some implementations, each table represents a unique entity type.

Furthermore, each table may contain one or more data categories logically arranged as columns or fields. For instance, a table of a user entity type may include fields for user name, organization, user title, user work group, contact information, and the like. Each row of a table can be configured to contain an instance of data for each category defined by the fields. Thus a first row in a user table may include user name, organization and contact information for a first user, while a second row in the user table includes the same categories for a second user.

In one example, marker 715 shown in FIG. 7 may be associated with a "user" entity type and specific record for a user, such as Sam Bailey, based on the box enclosing the letters "SB." As discussed above, a special marker may be placed on objects, such as marker 715 on business card 705, for the purpose of being recognized so that the appropriate record data may be matched with the marker.

In another example, a first marker may indicate the user entity type and additional information may be retrieved from one or more other markers. For instance, marker 715 may be a non-user specific marker that identifies a user entity type. Additional information determined from the image data, such as organization name 720, person name 725, phone number 730 or email address 735 as shown in image 700 in FIG. 7, can serve as a second marker. Any number of markers and any additional information that may be read from an image may be used in formulating queries to the database system to retrieve matching record data.

In another example, data of an image may be processed, such as by OCR techniques, to determine search terms that may be used to query the database system. For instance, the information on image 700 may be read and used to determine an entity type or specific record that most closely matches the data.

In another example, tables may be used for the purpose of associating image data with entity types and specific records. For instance, image recognition software may be used to identify sequences in numerical data contained in the pixels of an image. Once numerical data for a marker is identified, it may be used to query a table in the database system to find a marker field that most closely matches the numerical data. A record in the table may include a field for numerical data and another field that identifies an entity type or a specific record. Thus, once the record is identified by matching based on the numerical data, an associated entity type or specific record may be retrieved.

These examples illustrate how a marker may be identified and matched to record data, but it will be appreciated that other techniques may be used, such as flags, headers, formatting and other information associated with an image file. In general, any technique that allows data of an image to be matched with record data may be used in block 315.

Figure 8:
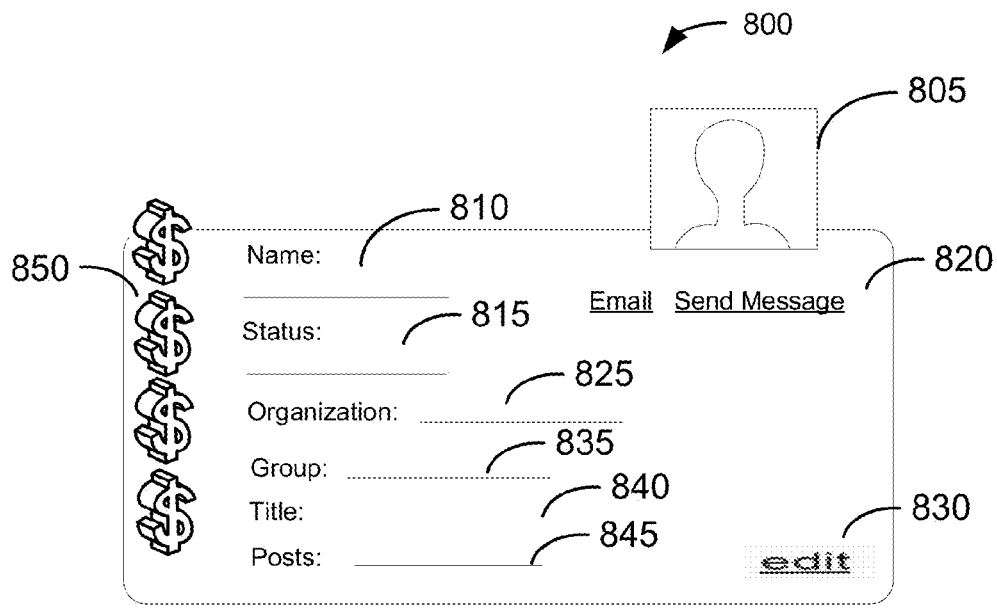
FIG. 8 shows an example of a three dimensional (3D) representation model 800, in accordance with some implementations.

In block 320, a 3D representation model is identified based on the entity type. A 3D representation model may be used as a template for displaying record data. For instance, a 3D representation model 800 for a user entity type, as shown in FIG. 8, may be used as a template for display of the record data 900 shown in FIG. 9. As will be described in further detail below, the use of 3D representation models allows for a graphical display of record data that may be altered based on the position or orientation of an object in an image so as to provide a consistent 3D presentation of a combination of both the record data and the image data.

In this example, 3D representation model 800 is designed to represent a virtual business card with predetermined locations where record data may be displayed. For instance, record data may be retrieved and displayed in locations shown for a user profile image 805, person name 810, user social network status 815, organization name 825, user work group 835, user title 840, and social network post count 845. Some or all of this information may be stored, for instance, in a record for a user entity type.

It will be appreciated that even though 3D representation model 800 is for a user entity type, record data from other entity types or tables may also be displayed on 3D representation model 800. For instance, graphic 850 indicates the value of an account associated with the user or the user's organization on a four dollar sign scale. Such information may be stored in an organization table that is associated with the user. Graphic 850 is only an example of the type of data and graphic that may be shown by 3D representation model 800. Virtually any field of any record may be shown in various graphical forms as a matter of design choice.

In some implementations, 3D representation model 800 further includes one or more interactive selections. For instance, organization name 825 may be a selectable link that can cause the computing device to retrieve and display record data for an organization. It will be appreciated that different 3D representation models may be associated with different entity types. Thus a different 3D representation model may be used to display record data for an organization rather than a user.

In another example, user contact links 820 may be selectable links that allow an email, telephone call or message (e.g., a message via a social network or CRM application) to be sent to the user. If the computing device is a smartphone, selecting a telephone call link may result in a telephone call being made to the user via the smartphone. In a third example, edit selection 830 may allow information in the database system to be updated, which is described in more detail below with respect to FIG. 4.

In general, because 3D representation model 800 is associated with a user entity type, it may be desirable to show various record data related to the user in some way. The selection of record data for display may vary and may be determined by business needs. Similarly, 3D representation model 800 may be configured based on the desired record data shown for a user entity type.

In block 325, a graphical display of the record data in combination with the image is provided to a display device, as described in greater detail below with reference to FIGS. 10-12. In some implementations, the graphical display includes a 3D representation of the record data based on the 3D representation model.

FIG. 9 shows an example of a display of record data 900 that is generated based on 3D representation model 800 shown in FIG. 8. Here, record data from the database system that is matched in block 315 of FIG. 3 is used to populate the display of the record data 900. Display of record data 900 includes user profile image 905, person name 910, user social network status 915, organization name 925, user work group 935, user title 940, and social network post count 945 for user Sam Bailey. Selectable user contact links 920 are configured such that selection of the links allows a communication such as an email, phone call, text message, or post to a social network feed to be sent to Sam Bailey. Graphical image 950 is populated with data from an organization associated with Sam Bailey. Here, graphic 950 includes three out of four 3D dollar signs as a symbolic representation of the value of an account associated with Sam Bailey or his organization.

Once the display of the record data is created, it may be combined with the captured image to create a graphical display that is provided to the display device. In FIG. 10, an example of a graphical display 1000 is shown that includes the display of the record data 900 overlaid with image 700 shown in FIG. 7.

In some implementations, the display of the record data may be altered based on the image data, such as a position or orientation of the marker in the image. As discussed above, if the image is a representation of the real world, then the display of the record data provides an augmented reality enhancement to the real world image. To that end, a display of record data based on a 3D representation model may be graphically altered in various dimensions to fit the real world display of an object in the image. In general, the 3D representation model identified in block 310 may be scaled, resized, rotated, shifted, tilted, turned or otherwise altered based on the position or orientation of objects such as a marker in an image.

In FIG. 7, image 700 is captured from a certain distance away from business card 705 and from a certain angle. The position or orientation of marker 715 may be determined from the image data. Here, marker 715 includes a box that is square if the image of business card 705 is captured from a perpendicular angle to the surface of business card 705 at the center of marker 715. In this case, 3D representation model 800 may be unaltered as shown by display of the record data 900 in graphical display 1000 in FIG. 10. 3D representation model 800 may also be resized based on the size of the box in marker 715 so that display of the record data 900 is similar in size to the object it represents, such as business card 705.

Figure 11:
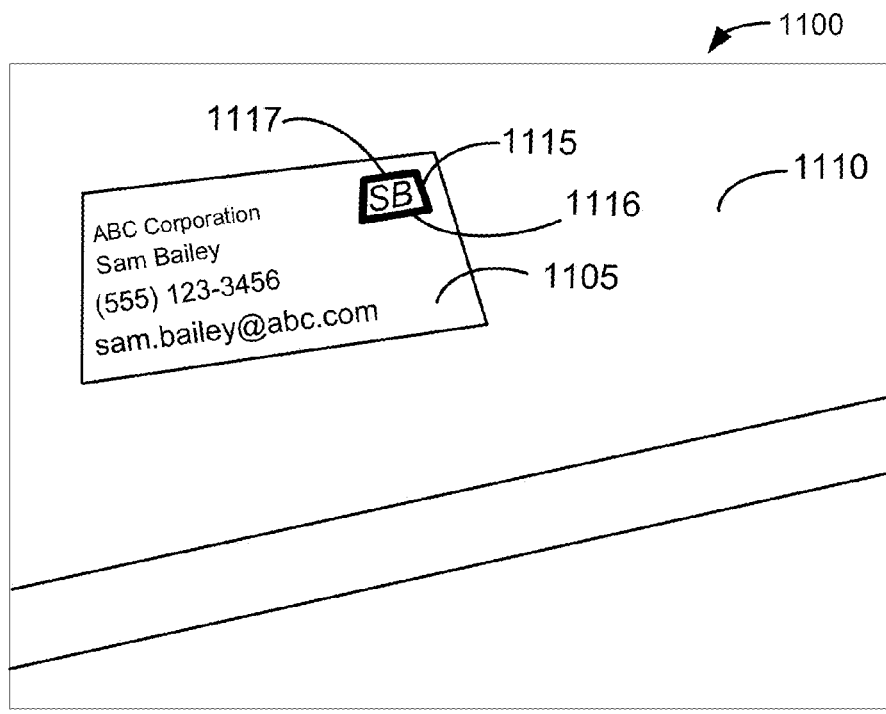
FIG. 11 shows an example of an image 1100, in accordance with some implementations.

However, if an image of a business card is captured from an indirect angle, as shown for business card 1105 on desk 1110 in FIG. 11, marker 1115 will appear trapezoidal wherein sides of the box closer to the image capturing device, such as side 1116, will appear longer than opposite sides of the box further from the image capturing device, such as side 1117. Thus, in order for display of the record data 900 to provide a better augmented reality display of business card 705, the 3D representation model identified in block 310 may be altered to match the orientation of the marker in an image.

Figure 12:
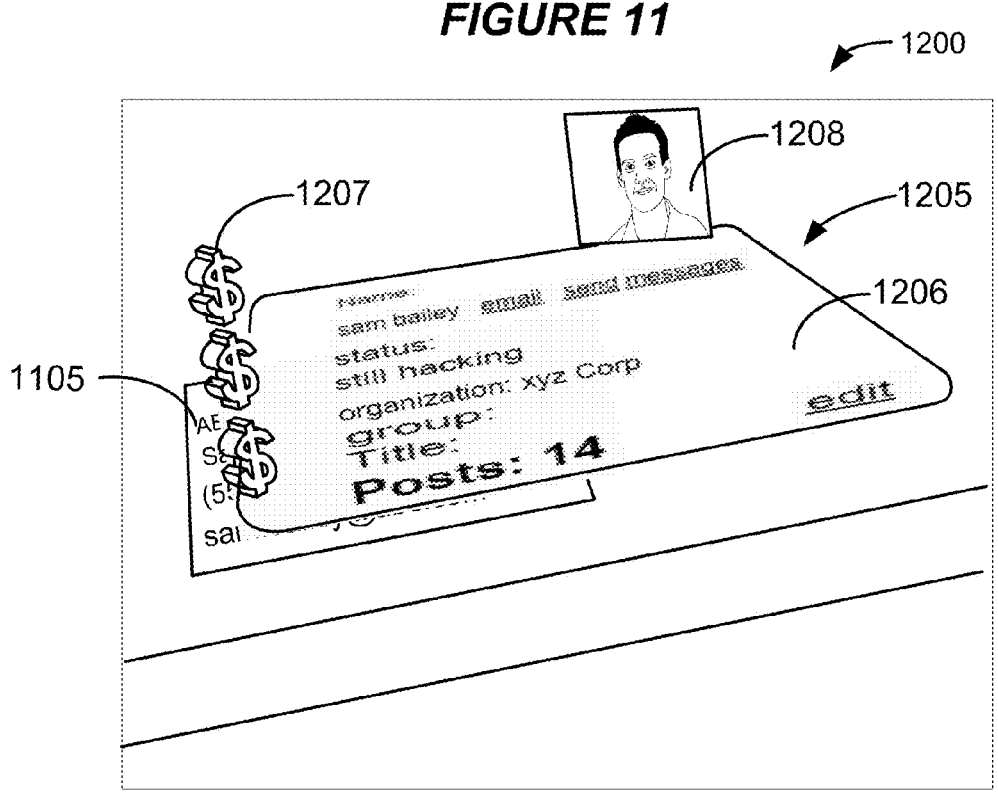
FIG. 12 shows an example of a graphical display 1200, in accordance with some implementations.

FIG. 12 shows an example of an altered graphical display 1200, including display of record data 1205, which is similar to display of record data 900 shown in FIG. 9. Here, however, display of record data 1205 has been altered based on marker 1115 in FIG. 11. Display of the record data 1205 includes a virtual card portion 1206, a graphic portion 1207 and user profile image portion 1208. As shown, virtual card portion 1206 is resized, tilted and rotated so as to create a virtual representation of business card 1105 as it positioned and oriented in image 1110. Graphic portion 1207 and user profile image portion 1208 are not altered in the same way. These portions are resized and rotated, but not tilted. Display of the record data 1200 shows an example of how different portions of a 3D representation model may be altered differently. However, in other examples, all portions of a 3D representation model may be altered in the same way.

Figure 4:
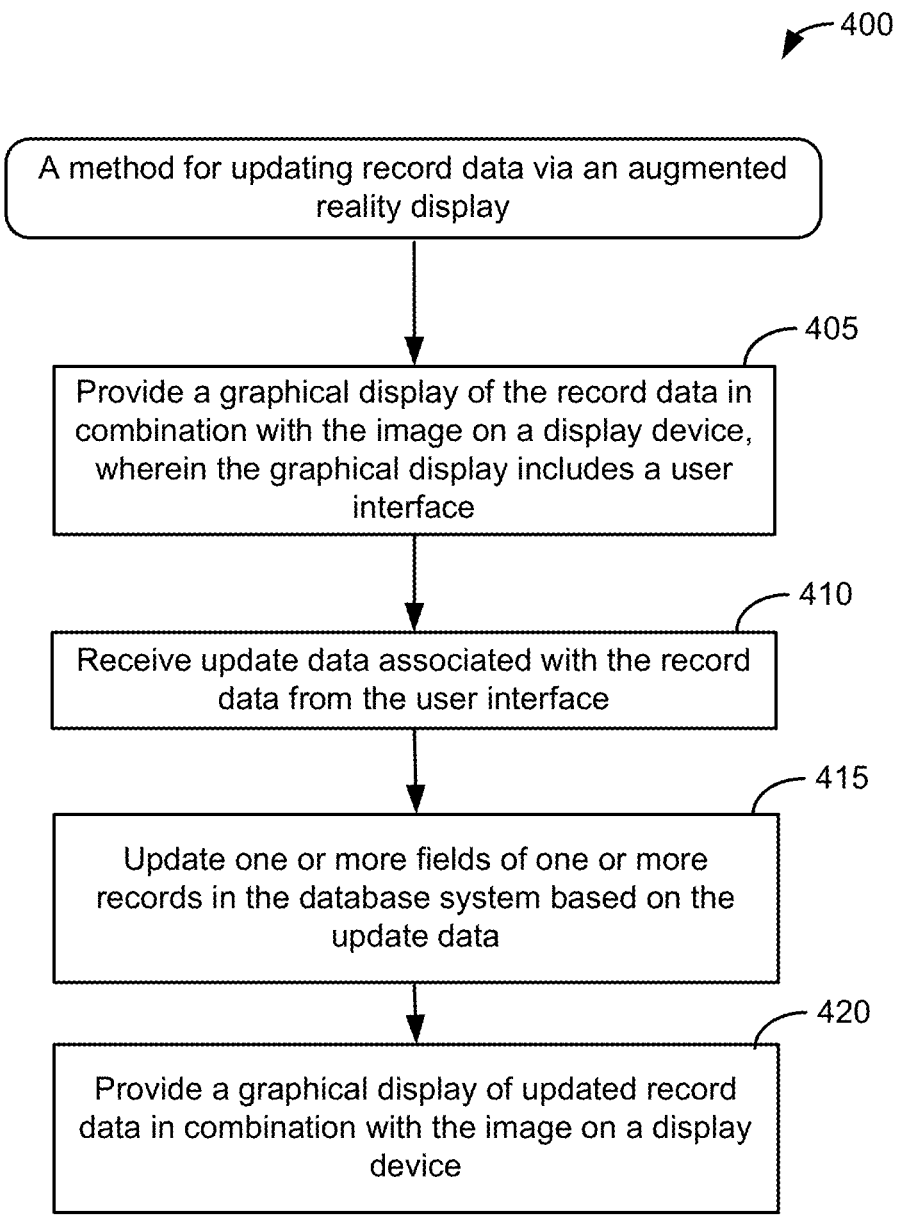
FIG. 4 shows a flowchart of an example of a method 400 for updating record data via an augmented reality display, performed in accordance with some implementations.

FIG. 4 shows a flowchart of an example of a method 400 for updating record data via an augmented reality display, performed in accordance with some implementations. In some implementations, the graphical display of the record data in combination with the image data, such as the graphical display 1000 shown in FIG. 10, may provide a user interface. The user interface may be configured to allow a user to update one or more records in the database system via the graphical display.

In block 405, a graphical display of record data in combination with an image is displayed on a display device. The discussion above regarding methods 200 and 300 and graphical display 1000 is generally applicable to block 405. As shown in FIG. 10, the graphical display 1000 may include edit selection 1030, which when selected, allows record data to be modified via graphical display 1000.

In one example, some of the record data to be incorporated in the graphical display may have blank or invalid fields in the database system. For instance, user title 1040 is blank, indicating that a corresponding field in the database system did not contain the desired information. In another example, some of the record data in the graphical display may have been stored in the database system incorrectly. Organization name 1025, for instance, indicates that Sam Bailey is an employee of XYZ Corporation, which is incorrect according to business card 705 shown in FIG. 7 that indicates he is an employee of ABC Corporation.

In block 410, update data associated with the record data is received from the user interface on a computing device on which the graphical display is presented. Generating update data may be achieved via the graphical display using virtually any input device. In some implementations, the input device may be a touch screen. The touch screen may be coupled with the display device such that a user may generate a record update by touching locations on the graphical display corresponding to interactive selections in the user interface. In other implementations, the input device may be a mouse, keyboard, a track pad, a microphone, or the like. In yet other implementations, the input may be received from any combination of one or more input devices, such as a mouse and keyboard.

In block 415, one or more fields of one or more records in the database system are updated based on the update data. In some implementations, updating records in the database system may include sending the update data to the database system. It may also include sending data that indicates the one or more fields wherein the update data is to be stored. It may further include receiving an indication from the database system that the one or more fields of the one or more records have been successfully updated.

In block 420, a graphical display of updated record data in combination with the image is displayed on the display device. Block 420 may be performed to provide an indication on the graphical display that the database system has been updated. For instance, after a successful update, organization name 1025 on graphical display 1000 will be updated to show that Sam Bailey is an employee of ABC Corporation. A viewer of graphical display 1000 may readily see whether the updated record data shown in the graphical display is correct or incorrect. The viewer may further interact with the user interface, such as providing additional update data. In this case, the method may return to block 410 discussed above.

Figure 5:
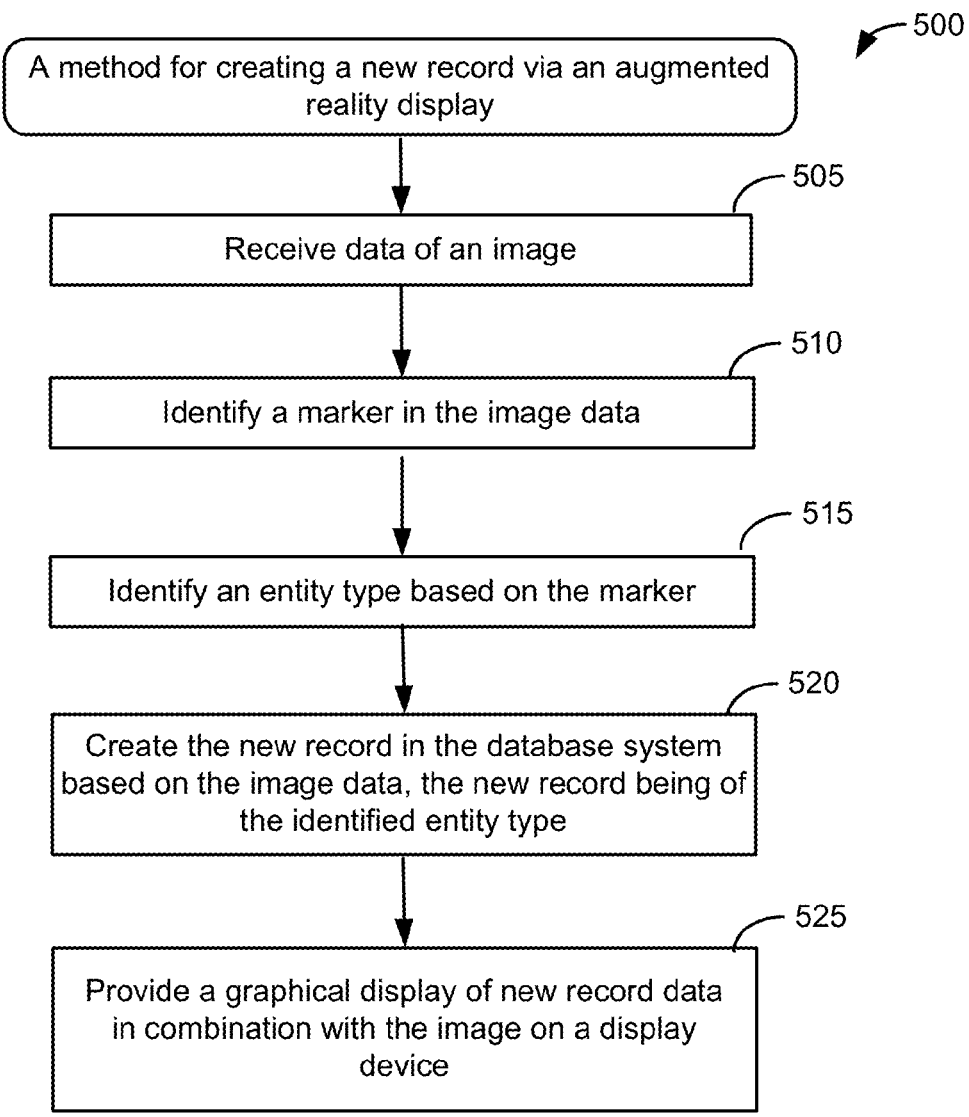
FIG. 5 shows a flowchart of an example of a method 500 for creating a new record via an augmented reality display, performed in accordance with some implementations.

FIG. 5 shows a flowchart of an example of a method 500 for creating a new record via an augmented reality display, performed in accordance with some implementations. In some implementations, an image may include a marker that is associated with an entity type but is not associated with a particular record. For instance, image data may indicate a user entity type but fail to indicate a specific person that currently exists in the database system. In some implementations, a new record may be created in the database system based on the image data.

In block 505, data of an image is received. In block 510, a marker is identified in the image data. In block 515, an entity type is identified based on the marker. However, unlike in methods 300 and 400 discussed above, there is no specific record in the database system that is matched with the image data.

With reference to FIG. 7, image 700 may be received in block 505. In this example, if Sam Bailey is not stored as a user in the database system, marker 715 may be associated with a user entity type but not a specific user. Image 700 may be processed using OCR techniques such that additional information determined from the image data, such as organization name 720, person name 725, phone number 730 or email address 735 on business card 705.

In block 520, a new record is created in the database system based on the image data. The new record may be of the identified entity type and stored in a corresponding table. As discussed above, each entity may be associated with one or more tables that include one or more records with one or more fields. Text data may be extracted from the image, such as via OCR techniques. The text data may then be parsed to determine whether any of the data belongs in at least one of the one or more fields of the record. For instance, person name 725 may be inserted into a record of the user entity in a user name field and organization name 720 may be inserted into the record in an organization field.

In block 525, a graphical display of new record data in combination with the image is provided on a display device. The graphical display allows for verification that the new record data was correctly determined from the image data. A user interface provided by the graphical display allows for corrections to the record data as well as for additional information to be entered. For instance, image 700 does not indicate Sam Bailey's user title, thus this information could be entered via the graphical display after the new record is created based on the image data.

In some implementations, the methods of FIGS. 2-5 discussed above may be performed by a computing devices or combination of computing devices in the architectures shown in FIGS. 1A and 1B. In one example, application servers 100 perform the blocks of the methods to provide a graphical display of record data stored in database system 16 (e.g., tenant data storage 22 or system data storage 24) to user system 12 as a cloud computing service. In FIG. 1B, user system 12 may access the cloud computing service via a web browser. The cloud computing service may control an input system 12C in the form of an image capturing device of user system 12 to capture an image, or the image capturing device can be operated by a user. The image may then be received at one or more application servers 100, where it may be matched with record data. A graphical display of the record data in combination with the image may then be sent to a display device, via the web browser, of output system 12D of user system 12.

In other implementations, the methods of FIGS. 2-5 discussed above may be performed by any computing device with access to a database storing record data. The computing device may include a controller, including one or more processors and one or more storage devices, wherein the one or more storage devices store machine readable instructions that are executable by the one or more processors to perform methods 2-5. Here, application servers 100 are not used to provide a cloud computing service to user system 12. Instead, user system 12 locally executes applications that access the record data stored in database system 16. In one example, user system 12 captures an image and performs the processing blocks of methods 200-500.

In some implementations, the record data that is provided in the graphical displays may also be shared with an electronic social network, a CRM application or a hybrid social network CRM application such as Chatter® provided by salesforce.com. In one example, these applications may also be provided to user systems 12 as a cloud computing service by application servers 100.

Figure 6:
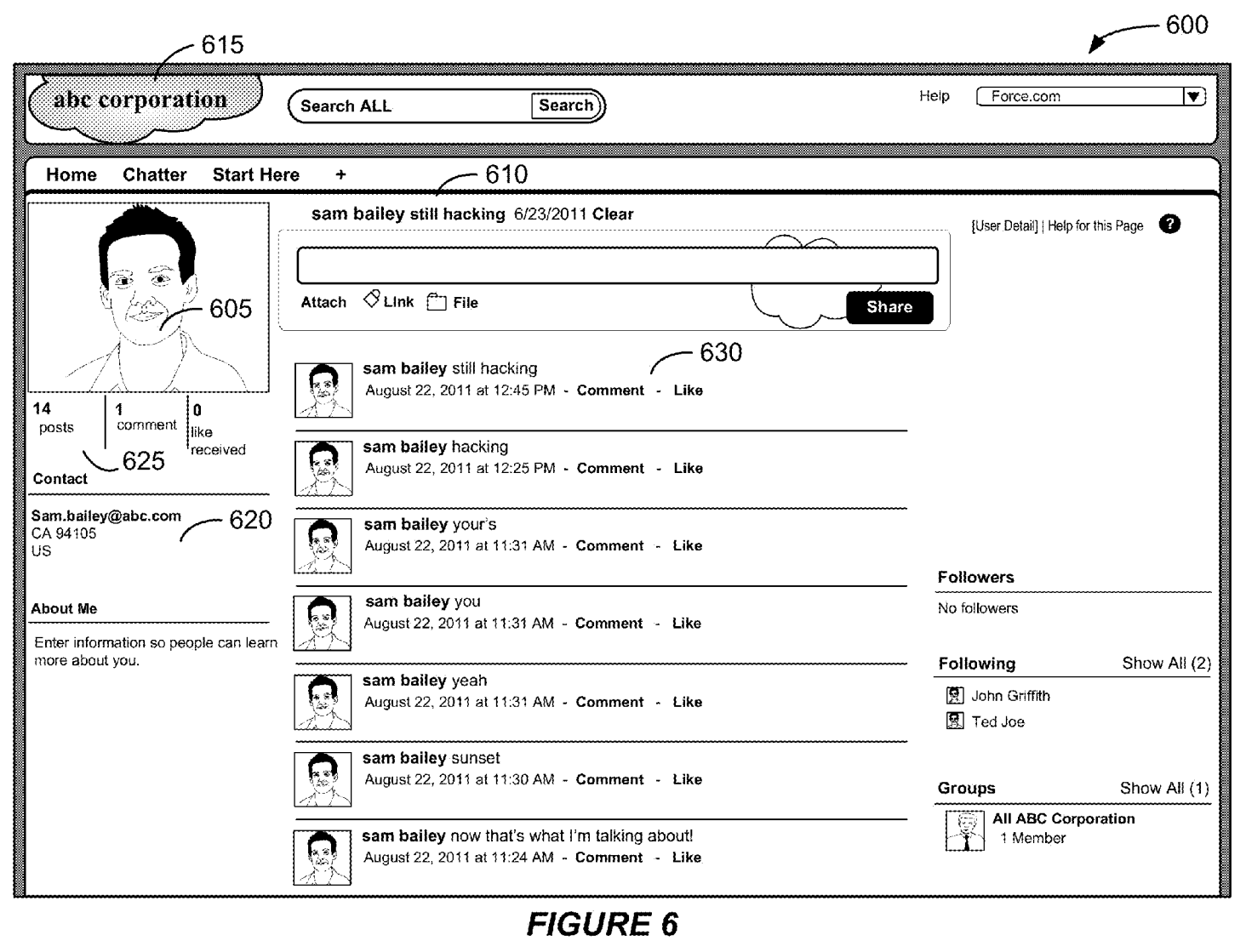

FIG. 6 shows an example of a user profile page 600 for Sam Bailey in an electronic social network incorporating record data, in accordance with some implementations. User page 600 includes record data that is also shown in display of the record data 900 in FIG. 9, such as user profile picture 605, social network status 610, organization name 615, contact information 620, social network post count 625 and information feed 630.

Updates to shared record data may be performed in a number of ways. Record data may be changed via user page 600. For instance, Sam Bailey may change his profile picture or his status. Such a change will result in record updates in the database system. In turn, the graphical displays of record data discussed above will include the updated record data. Similarly, any modifications of record data via the graphical displays may also be reflected in social networks and CRM applications that share the same record data.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

While the disclosed examples are often described herein with reference to an implementation in which an on-demand enterprise services environment is implemented in a system having an application server providing a front end for an on-demand database service capable of supporting multiple tenants, the present disclosure is not limited to multi-tenant databases nor deployment on application servers. Implementations may be practiced using other database architectures, i.e., ORACLE®, DB2® by IBM and the like without departing from the scope of the implementations claimed.

It should be understood that some of the disclosed implementations can be embodied in the form of control logic using hardware and/or using computer software in a modular or integrated manner. Other ways and/or methods are possible using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices. Computer readable media encoded with the software/program code may be packaged with a compatible device or provided separately from other devices (e.g., via Internet download). Any such computer readable medium may reside on or within a single computer program product (e.g., a hard drive or an entire computer system), and may be present on or within different computer program products within a system or network. A computer system, or other computing device, may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A computer implemented method for providing an augmented reality display of an image with database record data, the method comprising:
   receiving, at one or more processors, data of the image;
   sending a request message requesting record data associated with the image data from one or more of a plurality of Customer Relationship Management (CRM) records stored in a database system, the database system being associated with a CRM service;
   receiving the requested record data;
   generating a graphical display of the image augmented with the record data based at least in part on one or both of a position or an orientation of the image, the graphical display comprising a selectable link providing one or more of: access to a CRM record associated with the record data, or communication with a person associated with the image and associated with the record data; and
   providing the graphical display of the record data in combination with the image on a display device.

2. The computer implemented method of claim 1, wherein the record data is overlaid on the image in the graphical display.

3. The computer implemented method of claim 1, wherein the record data is stored in a plurality of fields of the one or more records.

4. The computer implemented method of claim 1, wherein the one or more records include a user profile in an online social network, and the record data includes information associated with the user profile.

5. The computer implemented method of claim 1, wherein the graphical display includes a three dimensional (3D) representation of the record data.

6. The computer implemented method of claim 5, wherein the 3D representation of the record data is altered based on a position or orientation of a marker in the image.

7. The computer implemented method of claim 1, wherein the image data includes a marker, the method further comprising:
   matching the marker with the record data.

8. The computer implemented method of claim 7, wherein the marker includes one or more of: a pattern, a string of characters, writing, electronic text, and printed text.

9. The computer implemented method of claim 7, wherein the marker is an object represented in the image.

10. The computer implemented method of claim 7, wherein the marker is associated with an entity type, the method further comprising:
    identifying a 3D representation model based on the entity type, wherein the graphical display includes a 3D representation of the record data, the 3D representation based on the 3D representation model.

11. The computer implemented method of claim 1, wherein the graphical display includes a user interface, the method further comprising:
    receiving update data associated with the record data from the user interface; and
    updating one or more fields of the one or more records in the database system based on the update data.

12. The computer implemented method of claim 1, wherein the record data is included in one or more of an online social network and a CRM application.

13. The computer implemented method of claim 1, wherein the record is associated with a person, and wherein the graphical display provides a user interface for interacting with the person.

14. The computer implemented method of claim 1, further comprising:
    receiving data of a second image;
    identifying a marker in the second image data;
    identifying an entity type based on the marker; and
    creating a new record in the database system based on the second image data, the new record being of the identified entity type.

15. The computer implemented method of claim 1, wherein the display device is associated with a computing device, the computing device further including an image capturing device operable to capture the image.

16. A computing system comprising:
    one or more servers; and
    system software stored on a non-transitory medium for the one or more servers, the system software operable to cause:
        retrieving record data associated with image data received from a user device from one or more of a plurality of Customer Relationship Management (CRM) records stored in a database system, the database system being associated with a CRM service; and
        generating information configured to be processed to produce a graphical display of an image corresponding to the image data and augmented with the record data based at least in part on one or both of a position or an orientation of the image, the graphical display comprising a selectable link providing one or more of: access to a CRM record associated with the record data, or communication with a person associated with the image and associated with the record data; and providing the generated information to the user device.

17. The computing system of claim 16, wherein the record data is overlaid on the image in the graphical display.

18. The computing system of claim 16, wherein the one or more records include a user profile in an online social network, and the record data includes information associated with the user profile.

19. The computing system of claim 16, wherein the graphical display includes a three dimensional (3D) representation of the record data.

20. The computing system of claim 16, wherein the image data includes a marker and wherein the system software is further operable to cause:
matching the marker with the record data.

21. The computing system of claim 20, wherein the marker is associated with an entity type and wherein the system software is further operable to cause:
identifying a 3D representation model based on the entity type, wherein the graphical display includes a 3D representation of the record data, the 3D representation based on the 3D representation model.

22. The computing system of claim 16, wherein the graphical display includes a user interface and wherein the system software is further operable to cause:
receiving update data associated with the record data from the user interface; and
updating one or more fields of the one or more records in the database system based on the update data.

23. The computing system of claim 16, wherein the record data is included in one or more of an online social network and a CRM application.

24. The computing system of claim 16, wherein the record is associated with a person, and wherein the graphical display provides a user interface for interacting with the person.

25. The computing system of claim 16, wherein the system software is further operable to cause:
receiving data of a second image;
identifying a marker in the second image data;
identifying an entity type based on the marker; and
creating a new record in the database system based on the second image data, the new record being of the identified entity type.

26. The computing system of claim 16, wherein the display device is associated with a computing device, the computing device further including an image capturing device operable to capture the image.

27. A computing device comprising:
a display device;
an image capturing device operable to capture an image; and
a controller configured to:
receive data of the image;
send a request message requesting record data associated with the image data from one or more of a plurality of Customer Relationship Management (CRM) records stored in a database system, the database system being associated with a CRM service;
receive the requested record data; and
generate a graphical display of the image augmented with the record data based at least in part on one or both of a position or an orientation of the image, the graphical display comprising a selectable link providing one or more of: access to a CRM record associated with the record data, or communication with a person associated with the image and associated with the record data; and
provide the graphical display of the record data in combination with the image on a display device.

28. The computing device of claim 27, wherein the graphical display includes a 3D representation of the record data and wherein the 3D representation of the record data is altered based on a position or orientation of a marker in the image.

29. A non-transitory tangible computer-readable storage medium storing instructions executable by one or more processors of a computing device to cause a method to be performed for providing an augmented reality display of an image with database record data, the method comprising:
receiving, at one or more processors, data of the image;
sending a request message requesting record data associated with the image data from one or more of a plurality of Customer Relationship Management (CRM) records stored in a database system, the database system being associated with a CRM service;
receiving the requested record data;
generating a graphical display of the image augmented with the record data based at least in part on one or both of a position or an orientation of the image, the graphical display comprising a selectable link providing one or more of: access to a CRM record associated with the record data, or communication with a person associated with the image and associated with the record data; and
providing the graphical display of the record data in combination with the image on a display device.

30. The non-transitory tangible computer-readable storage medium of claim 29, wherein the graphical display includes a 3D representation of the record data and wherein the 3D representation of the record data is altered based on a position or orientation of a marker in the image.

31. The non-transitory tangible computer-readable storage medium of claim 29, wherein the graphical display includes a user interface, the method further comprising:
receiving update data associated with the record data from the user interface; and
updating one or more fields of the one or more records in the database system based on the update data.

32. The non-transitory tangible computer-readable storage medium of claim 29, the method further comprising:
receiving data of a second image;
identifying a marker in the second image data;
identifying an entity type based on the marker; and
creating a new record in the database system based on the second image data, the new record being of the identified entity type.

* * * * *